United States Patent [19]

Yano

[11] 4,399,789
[45] Aug. 23, 1983

[54] WARM UP CONTROL SYSTEM FOR AN INTERNAL COMBUSTION ENGINE

[75] Inventor: Tsuneomi Yano, Tokyo, Japan

[73] Assignee: Nissan Motor Company, Limited, Kanagawa, Japan

[21] Appl. No.: 232,406

[22] Filed: Feb. 6, 1981

[30] Foreign Application Priority Data

Jul. 2, 1980 [JP] Japan .................... 55-13961

[51] Int. Cl.³ .............. F02D 1/04; F02M 51/06; F02D 9/02
[52] U.S. Cl. .................... 123/340; 123/339; 123/417; 123/418
[58] Field of Search ............... 123/340, 339, 417, 418

[56] References Cited

U.S. PATENT DOCUMENTS

| | | | |
|---|---|---|---|
| 3,964,457 | 6/1976 | Coscia | 123/340 |
| 4,203,395 | 5/1980 | Cromas et al. | 123/339 |
| 4,223,654 | 9/1980 | Wessel et al. | 123/340 |
| 4,237,838 | 12/1980 | Kinugawa et al. | 123/339 |
| 4,244,023 | 1/1981 | Johnson | 123/340 |
| 4,289,100 | 9/1981 | Kinugawa et al. | 123/339 |
| 4,297,978 | 11/1981 | Matsui | 123/339 |

*Primary Examiner*—Raymond A. Nelli
*Attorney, Agent, or Firm*—Schwartz, Jeffery, Schwaab, Mack, Blumenthal & Koch

[57] ABSTRACT

There is provided a warm up control system for an internal combustion engine which controls the engine speed, spark ignition timing and the spark advance in order to keep the engine operating condition in desirable for maximizing the warm up efficiency and minimizing of exhaust emission and fuel consumption. The control system include an electronic controlled storing tables respectively representative of a target engine speed, a required maximum engine warm up rate and a required engine stability in relation to an engine temperature and a crank revolution angle as a representative of the engine speed. In the system, the engine speed, spark ignition timing and the spark advance are controlled so that the engine operating condition adapts the determined target engine speed, the maximum engine warm up rate and the maximum engine stability.

12 Claims, 9 Drawing Figures

WARM UP CONTROL SYSTEM FOR AN INTERNAL COMBUSTION ENGINE

BACKGROUND OF THE INVENTION

The present invention relates generally to a warm up control system for an internal combustion engine for effectively warming up the engine when the engine is started under cold engine conditions. More specifically, the invention relates to an electronic control system for warming up of the internal combustion engine providing effective warm up characteristics of the engine by controlling the engine operating conditions to the maximum idle engine speed with the maximum engine stability.

Recently, there have been developed various electronic engine control system for the purpose of fuel economy, maximum engine output efficiency, improving drivability and/or minimizing of emission and fuel consumption. For the engine warm up from a cold start, an engine control effected by electronic control systems are preferably in order to improve warm efficiency with the minimum fuel consumption and exhaust emission. It is required for engine warm up operation under cold engine conditions, to feedback control the engine speed corresponding to the engine temperature and engine stability. The intake air flow rate in the engine warm up condition, and spark ignition timing are therefore to be controlled for bringing the engine speed to a predetermined value based on the engine temperature and engine driving stability.

For warming up during the engine idling condition, as is well-known, the intake air is supplied through an auxiliary induction passage bypassing the throttle valve. The auxiliary induction passage is provided with an electromagnetically operable idle air control valve so that it can control the air flow rate flowing therethrough to adapt the actual engine speed to the predetermined value. Also, the spark ignition timing is controlled for maximum engine warm up efficiency with desirable engine operating conditions. In the disclosure, the wording "engine warm up efficiency" or "engine warm up rate" is used to represent an engine temperature variation speed form warm-up under cold engine conditions. Therefore, the engine warm up efficiency or the engine warm up rate may be considered as the engine warm up speed which is variable depending on the engine speed. To obtain fast engine warm up speed, relatively high engine speed is required. On the other hand, by the high engine speed under substantial cold engine conditions, emission cannot be satisfactorily controlled due to the inactive state of the exhaust gas purifier.

SUMMARY OF THE INVENTION

Therefore, it is an object of the present invention to provide a warm up control system of an internal combustion engine, which control system feedback controls both the intake air flow rate flowing through the auxiliary induction passage, and the spark ignition timing based on various engine operating parameters.

Another and more specific object of the present invention is to provide a warm up control system of an internal combustion engine by feedback controlling the idle engine speed, and the spark ignition timing in order to bring the engine warm up rate to the desired maximum rate, a difference between the actual engine speed and the target engine speed with the desired maximum engine stability.

According to the present invention, there is provided a warm up control system for an internal combustion engine which controls the engine speed, and the spark ignition timing in order to keep the engine operating condition desirable for maximizing the warm up efficiency and minimizing the exhaust emission and the fuel consumption. The control system includes an electronically controlled controller storing tables respectively representative of a target engine speed, a required maximum engine warm up rate and a required engine stability in relation to an engine temperature and a crank revolution angle as a representative of the engine speed. In the system, the engine speed, and the spark ignition timing are controlled so that the engine operating condition adapts the determined target engine speed, the maximum engine warm up rate and the maximum engine stability.

BRIEF DESCRIPTION OF THE DRAWINGS

The present invention will become more fully understood from herebelow given detailed description of the invention and from the accompanying drawing of a preferred embodiment of the present invention, which, however, should not be taken as limitative to the present invention but/for elucidation and explanation, only.

In the drawings.

DESCRIPTION OF THE PREFERRED EMBODIMENT

Figure 1:
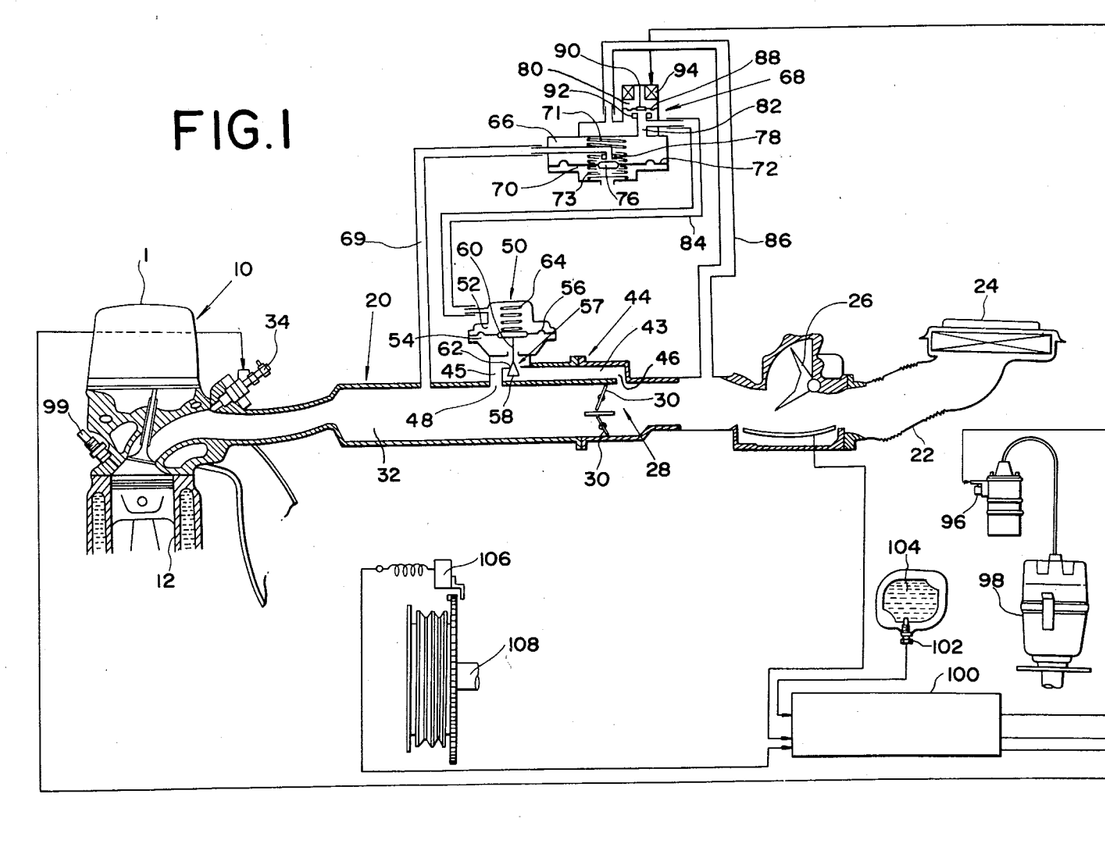
FIG. 1 is a schematic diagrammatical view of a preferred embodiment of a warm up control system for an internal combustion engine according to the present invention.

Referring now to the drawings, and particularly to FIG. 1, in which is illustrated and shown the general construction of an internal combustion engine having a computer controlled fuel injection system, to be provided in an automotive vehicle. A control system according to the present invenion is schematically shown in a form of diagram as applied to this internal combustion engine, as an example and for the purposes of explanation only, and should not be taken as limitative of the scope of the present invention to the control system applied to this specific engine. It should be appreciated that the system according to the present invention will be applicable to any type of internal combustion engine which can be controlled by a microcomputer mounted on the vehicle.

In FIG. 1, each of the engine cylinders 12 of an internal combustion engine 10 communicates with an air intake passage generally designated by 20. The air intake passage 20 comprises an air intake duct 22 with an air cleaner 24 for cleaning atmospheric air, an air flow meter 26 provided downstream of the air intake duct 22 to measure the amount of intake air flowing therethrough, a throttle chamber 28 in which is disposed a throttle valve 30 cooperatively coupled with an accelerator pedal (not shown) so as to adjust the flow rate of intake air flowing therethrough, and an intake manifold 32 having a plurality of conduit not clearly shown in FIG. 1. Although there is not clearly illustrated in FIG. 1, the air flow meter 26 is incorporated with other engine control systems which determines fuel injection amount, for example. A fuel injector 34 is provided in the intake manifold 32. The fuel injection amount through the fuel injector 34 is controlled by an electromagnetic actuator (not shown). The actuator is electrically operated by the other control system which determines fuel injection amount, fuel injection timing and so on corresponding to engine operating condition determined based on engine operation parameters such as an engine load, engine speed and so on. It should be noted that, although the fuel injector 34 is disposed on the intake manifold 32 in the shown embodiment, it is possible to locate it in the combustion chamber 12 in a per se well known manner.

A bypass passage 44 is provided to the intake air passage 20. One end 46 of the bypass passage 44 opens between the air flow meter 26 and the throttle valve 30 and the other end 48 opens downstream of the throttle valve 30, adjacent to the intake manifold 32. Thus the bypass passage 44 bypasses the throttle valve 30 and connects the upstream of the throttle valve 30 to the intake manifold 32. An idle control valve, generally designated by 50, is provided in the bypass passage 44. The idle control valve 50 generally comprises two chambers 52 and 54 separated by a diaphragm 56. The bypass passage 44 is thus separated by the valve means 50 into two portions 43 and 45 respectively located upstream and downstream of the port 57 of the valve 50. The valve means 50 includes a poppet valve 58 disposed within the port 57 in a manner that it is movable between two position, one opening the valve to establish the communication between the portions 43 and 45 of the passage 44 and the other closing the valve to block the communication therebetween. The poppet valve 58 has a stem 60 whose end is secured to the diaphragm 56 so as to cooperatively move therewith. The diaphragm 56 is biased downwards in the drawing, so as to release the poppet valve 58 from a valve seat 62, by a helical compression coil spring 64 disposed within the chamber 52 of the valve means 50. Thereby, the valve 50 is normally opened, and normally communicates the portions 43 and 45 of the bypass passage 44 to one another, via its valve port 57.

The chamber 54 of the idle control valve 50 is opened to the atmosphere to introduce the atmospheric air thereinto. On the other hand, the chamber 52 of the idle control valve 50 communicates with a pressure regulating valve 68 as the control vacuum source through a vacuum passage 84. The pressure regulating valve 68 is separated into generally two chambers 66 and 70 by a diaphragm 72. The chamber 66 of the pressure regulating valve 68 is also communicated with the downstream of the throttle valve 30 through the vacuum passage 60 so as to introduce the intake vacuum. The chamber 70 is open to the atmosphere in a per se well known manner. To the diaphragm 72 is secured a valve member 76 which is opposed to a valve seat 78 provided at the end of the passage 69. In the chambers 66 and 70 there are respectively disposed helical compression springs 71 and 73. The springs 71 and 73 are generally of equal spring pressure in a position in which the diaphragm 72 is in neutral position. It will be noted that the chamber 66 can also be connected with a exhaust-gas recirculation (EGR) control valve which recirculates a part of the exhaust gas flowing through an exhaust passage to the intake manifold 32.

The diaphragm 72 is moved upwards or downwards by the change of the balance between the vacuum in the chamber 66 and the atmospheric pressure introduced into the chamber 70. By this moving of the diagram 72, the valve member 76 is moved toward or away from the valve seat 78.

Another chamber 80 is also defined in the control valve 68, which chamber 80 communicates with the chamber 66 through a passage 82. The passage 82 is connected with the chamber 52 of the idle control valve 50 through a control vacuum passage 84. On the other hand, the chamber 80 is further commuciated with the air intake passage 20 upstream of the throttle valve 30 through a passage 86 so as to introduce the atmospheric air. The chamber 80 is partitioned by a diaphragm 88 on which a magnetic valve member 90 is secured. The magnetic valve member 90 opposes a valve seat 92 formed at the end of the passage 82. Also, the magnetic valve member 90 opposes an electromagnetic actuator 94 which itself is controlled by the ratio of an energized period and a deenergized period of a control pulse signal generated by a controll 100. Depending on the amount of the atmospheric air introduced into the passage 82 from the chamber 80, which amount is determined by the ratio of energized period and deenergized period of the electromagnetic actuator 94, the control vacuum for controlling the opening degree of the valve member 58 of the idle control valve 50 is regulated and fed thereto through the control vacuum passage 84.

The controller 100 further controls the spark timing of the engine based on hereinafter described various engine operation parameters. The ignition coil 96 is connected with a distributor 98 to be supplied therefrom an electric power for ignition of a spark ignition plug 99.

When it is desired to warm up the internal combustion engine 10 in an idling condition and the engine is cold, the throttle valve 30 is generally closed so as to restrict the flow of intake air therethrough. Therefore, during the idling condition of the internal combustion engine 10, the intake air flows through the bypass passage 44, which bypasses the throttle valve 30 and connectes the upstream and the downstream of the throttle valve 30. The air flow rate through the bypass passage 44 is generally controlled by the idle control valve 50. The idle control valve 50 is operated by the control vacuum fed from the pressure regulating valve 68. For regulating the control vacuum, a vacuum pressure in the downstream of the throttle valve 30 is introduced into the chamber 66 of the pressure regulating valve 68. The vacuum pressure introduced into the chamber 66 is firstly controlled by the operation of the valve member 76 to be maintained constant. The vacuum in the passage 82 disposed between the chambers 66 and 80 is then controlled by the valve member 90 which is moved to and fro with respect to the valve seat 92 by the electromagnetic actuator 94. The actuator 94 is controlled by the ratio of energized and deenergized period thereof by a control pulse signal indicative of a duty factor fed from the controller 100.

By opening the passage 82 and establishing the communication between the chambers 66 and 80, the atmospheric air is introduced into the passage 82. Therefore, by adjusting the ratio of the opening and closing periods of the valve 90, the magnitude of vacuum pressure is adjusted which is applied to the chamber 52 through the passage 84. Thus regulated vacuum acts as the control vacuum for the idle control valve 50. The opening degree of the valve member 58 of the idle control valve 50 is controlled by the control vacuum in the chamber 52 and thus the air flow rate flowing through the bypass passage 44 is controlled. Since the engine speed of the internal combustion engine depends on the intake air flow rate supplied thereto, it can be thus controlled by controlling the idle control valve 50.

The controller 100 generally comprises a microcomputer composed of an interface, ROM, RAM, CPU and some registers and is connected with an air flow meter 26, an engine coolant temperature sensor 102 provided in a coolant passage or chamber 104 in the engine cylinder block, and a crank angle sensor 106 opposing to a crank shaft 108. The air flow meter 26 measures the intake air flow rate and generates an analog signal indicative of the measured intake air flow rate. For making the analog signal generated by the air flow meter 26 applicable to the controller 100, an analog-digital converter (not shown) will be interposed between the controller 100 and the air flow meter 26 or will be composed within the interface of the microcomputer as the controller. Likewise, an analog-digital converter (not shown) is required between the engine coolant temperature sensor 102 and the controller 100. The temperature sensor 102 measures the temperature of the engine coolant and generates a sensor signal $T_W$ indicative of the measured coolant temperature. The crank angle sensor 106 electromagnetically picks up the crank angle and generates a crank angle sensor signal $N_{RPM}$ which represents an engine revolution speed.

Now, the operation of the controller 100 is described hereafter with reference to FIGS. 5 to 9. For better understanding the concept of the invention and the functions of the controller 100, the fundamental logic of the warm up control in accordance with the present invention is briefly described with reference to FIGS. 2 to 4.

Figure 2:
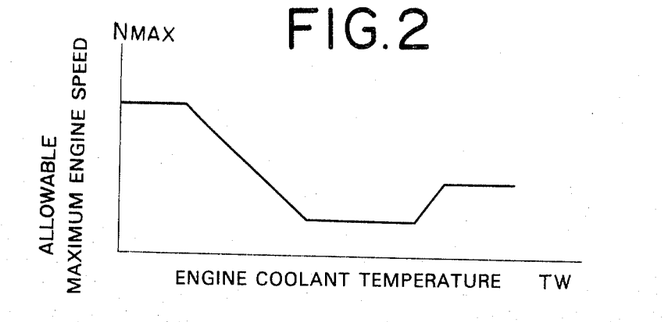
FIG. 2 is a graph showing a relationship between the engine temperature and the allowable maximum engine speed.

FIG. 2 shows a relationship between the engine coolant temperature $T_W$ and the allowable maximum engine revolution speed $N_{MAX}$ when idling. In the graph of FIG. 2, the horizontal intermediate range, where the allowable maximum engine speed $N_{MAX}$ is the lowest, is the normal temperature range, e.g., approximate 60° C. to 95° C. in which warming up of engine is not required. In this normal engine temperature range, the engine speed $N_{MAX}$ is set in a range of approximately 600 r.p.m. to 800 r.p.m. To the contrary, in a substantially cold engine temperature range, e.g., less than approximate 40° C., the maximum engine speed $N_{MAX}$ is set in a range of approximate 1,400 r.p.m. to 1,600 r.p.m. Likewise, in a substantially high engine temperature range, in an overheating condition, e.g., more than approximate 100° C., the maximum engine speed $N_{MAX}$ is set higher than the normal engine idle speed but less than that in a substantially cold engine condition for the fast radiation purpose. The maximum engine speed $N_{MAX}$ acts as a target engine speed for feedback controlling the engine speed $N_{RPM}$ based on a difference between the target engine speed and the actual engine speed.

Figure 3:
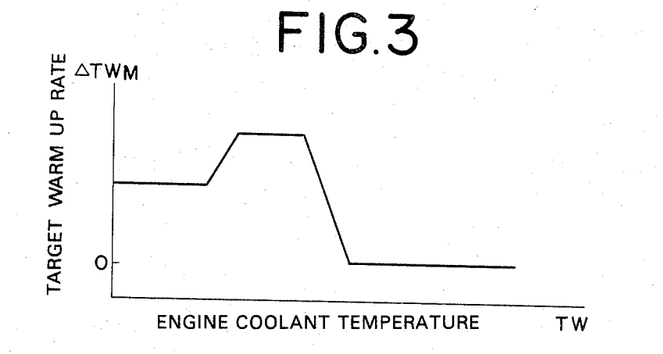
FIG. 3 is a graph showing a relationship between the engine temperature and the target engine warm up rate.

FIG. 3 shows a relationship between the target engine warm up rate $\Delta T_{WM}$ and the engine coolant temperature $T_W$. For minimizing the emission during warming up from a substantially cold engine condition and until the catalyst in the exhaust gas pulifyer is sufficiently warmed up for effectively working, the target engine warm up rate $\Delta T_{WM}$ is limited at relatively lower value. After the warmed up condition of the exhaust gas pulifier catalyst and the engine, the target warm up rate $\Delta T_{WM}$ becomes larger and reaches the maximum value for increasing the warm up efficiency of the engine. Further, as apparent from FIG. 3, the target warm up rate $\Delta T_{WM}$ is rather dropped to the minimum value when the engine or the engine coolant temperature becomes higher into the normal temperature range, i.e., approximately 60° C. to 95° C., since warming up of the engine is no longer necessary.

Figure 4:
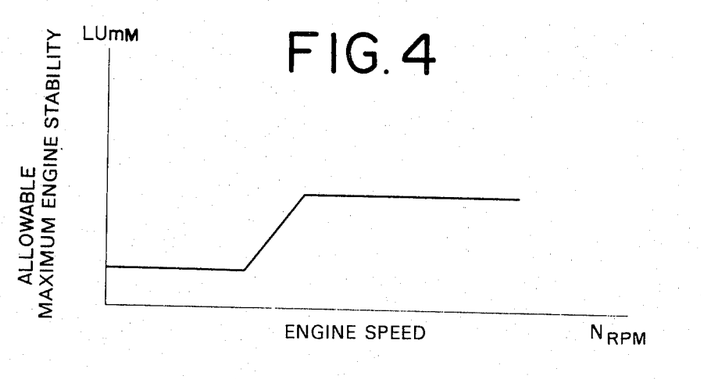
FIG. 4 is a graph showing a relationship between the engine speed and the allowable maximum engine stability.

FIG. 4 shows a relationship between the engine speed $N_{RPM}$ and the allowable maximum engine stability LUmM. Under the engine and engine coolant temperature condition lower than that of the normal range, the allowable maximum engine stability LUmM is limited relatively lower so as to permit rapidly increasing the engine speed for rather high warm up efficiency. On the other hand, in the normal engine coolant temperature range, the allowable engine stability LUmM is set at the maximum value for maintaining the engine in idling condition with the maximum engine stability. The engine stability relates to the spark ignition timing.

Generally, the intake air flow rate is controlled corresponding to the difference between the actual engine speed and a target engine speed $N_{MAX}$ which is determined corresponding to the engine or engine coolant temperature $T_W$.

The engine warm up rate $\Delta T_W$ is determined by comparing the coolant temperature $T_W$ obtained in the current cycle of control operation and the immediate preceding cycle of control operation. If the obtained engine warm up rate is less than the target warm up rate $\Delta T_{WM}$, the controller 100 controls the spark timing to retard. At the time, the engine speed $N_{RPM}$ is also controlled by the controller 100 to accelerate. The controller 100 controls the engine speed $N_{RPM}$ so that it may not exceed the allowable maximum engine speed $N_{MAX}$. On the other hand, the engine warm up rate $\Delta T_W$ is equal to or more than the target engine warm up rate $\Delta T_{WM}$, the spark timing is advanced and the engine speed $N_{RPM}$ is decelerated. The deceleration of the engine speed is limited at the lower limit of the engine speed so that the average engine stability LUm is not lowered to less than the allowable maximum engine stability.

As described above, according to the present invention, the engine speed, and the spark ignition timing in the process of the engine warming up under the cold engine condition are controlled based on the engine or engine coolant temperature, the engine speed, the intake air flow rate as control parameters in order to obtain maximum engine warm up efficiency under required engine stability and under desirable engine operating condition.

According to the above-mentioned logic of the warm up control, the characteristic of the maximum engine speed $N_{MAX}$ corresponding to the engine temperature $T_W$, the characteristic of the target temperature rising rate corresponding to the engine temperature and the characteristic of the allowable engine stability corresponding to the engine speed are stored in a memory unit in the controller 100 as data tables.

Figure 5:
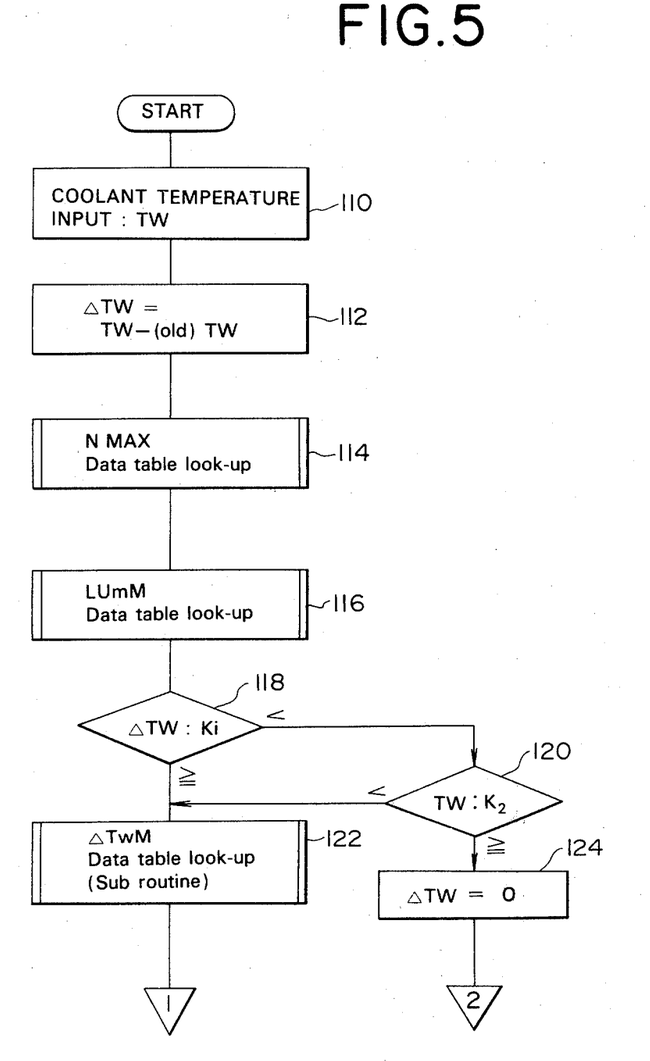
FIG. 5 is a flow chart of a controller operation, showing a main routine of a warm up control program.

Now, referring to FIGS. 5 to 9, the warm up control program to be executed by the controller 100 which comprises a micro-computer is described hereafter. FIG. 5 shows a main routine of the control program. Immediately after the program starts to run, the engine coolant temperature sensor signal $T_W$ is inputted to the controller 100 and written in the memory unit, at step 110. A difference $\Delta T_W$ of the coolant temperatures between that written in at step 110 and that written in at the same step during the immediate preceding cycle of the program execution is calculated at a step 112. At the step 112, the obtained temperature difference $\Delta T_W$ is stored in the memory unit.

Based on the coolant temperature $T_W$, an allowable maximum engine speed $N_{MAX}$ is obtained by table look-up operation at a step 114. It will be appreciated that the determined allowable maximum engine speed $N_{MAX}$ accords with the characteristics shown in FIG. 2. Based on the determined maximum engine speed $N_{MAX}$, an allowable maximum engine stability LUmM is determined by table look-up from the data table containing the characteristics of FIG. 4, at step 116.

At step 118, the coolant temperature difference $\Delta T_W$ which represents the engine warm up rate as obtained at step 112 is compared with a first predetermined value $K_1$. If the temperature difference $\Delta T_W$ is less than the first predetermined value $K_1$, the inputted coolant temperature signal $T_W$ is compared with a second predetermined value $K_2$ at a block 120. If the coolant temperature $T_W$ is less than the second predetermined value $K_2$ or the coolant temperature different $\Delta T_W$ is equal to or more than the first predetermined value $K_1$, a target warm up right $\Delta T_{WM}$ is determined by table look up from a data table containing characteristics shown in FIG. 3, at step 122. On the other hand, if the coolant temperature $T_W$ is equal to or more than the second predetermined value $K_2$, the coolant temperature difference $\Delta T_W$ is set to zero, at step 124.

Figure 6:
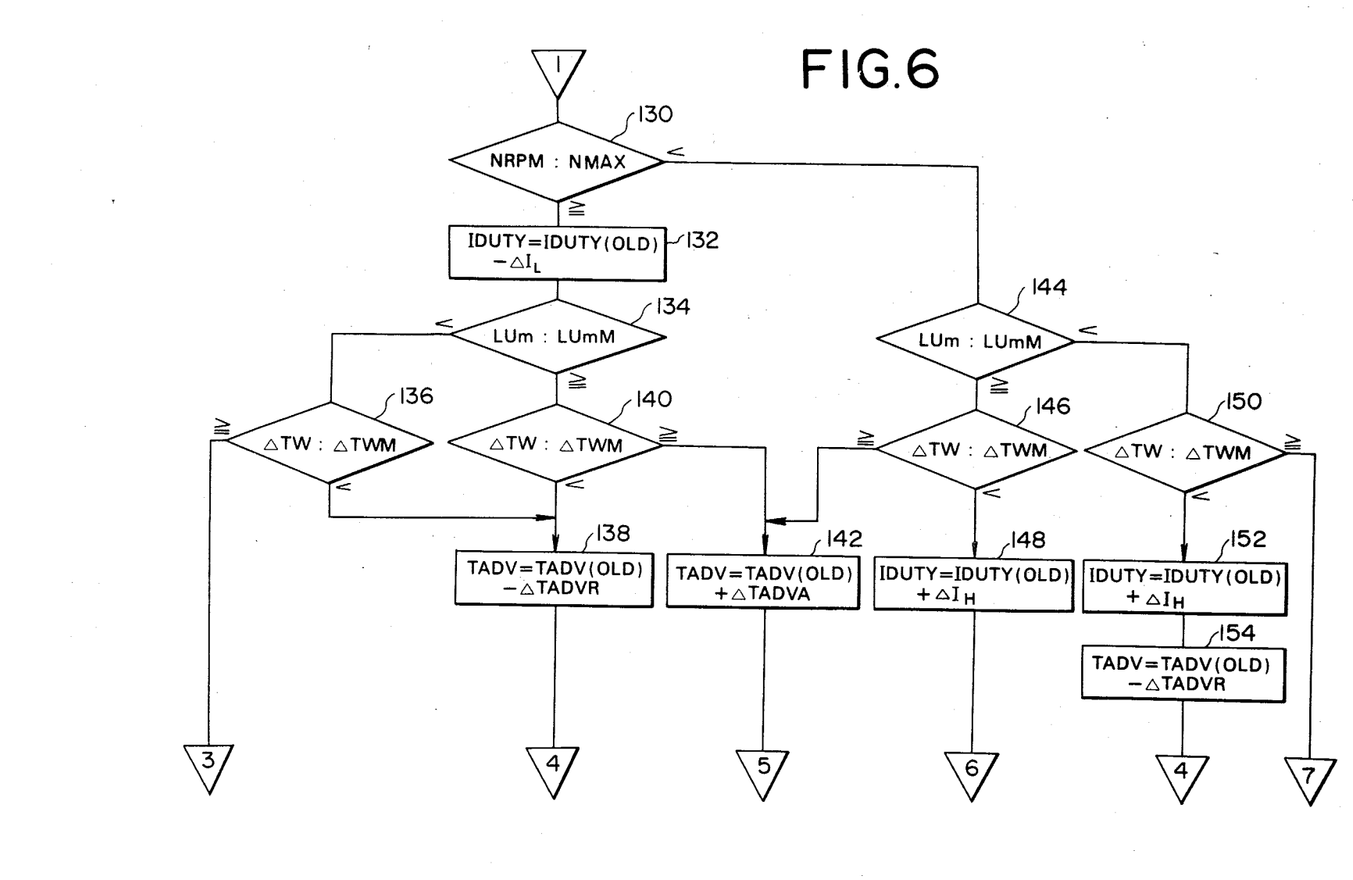
FIG. 6 is a flowchart of a first routine to be executed following to the main routine of FIG. 5 when the rate of varying of engine temperature is equal to or more than a first predetermined value or is less than a second predetermined value.

In case the coolant temperature difference $\Delta T_W$ is equal to or more than the first predetermined value $K_1$, or the coolant temperature $T_W$ is less than the second predetermined value $K_2$, the program jumps to "Marge 1" shown in FIG. 6 after step 122. In the routine "Marge 1", at first, the actual engine speed $N_{RPM}$ obtained by the crank angle sensor 106 and inputted therefrom is compared with the maximum engine speed $N_{MAX}$ obtained at the foregoing step 114, at step 130. If the actual engine speed $N_{RPM}$ is equal to or more than the maximum engine speed $N_{MAX}$, a duty factor $I_{DUTY}$ of the control signal for controlling the actuator 94 and defining the ratio of energized period and deenergized period thereof, which duty factor is determined in preceding cycle of program execution, is decremented at a given rate $\Delta I_L$ at step 132. Then, an average engine stability LUm is compared with the allowable maximum engine stability LUmM which is determined at step 116. Here, the average engine stability LUm is obtained by comparing each of the adjacent crank standard angle pulse intervals. Namely, assuming the crank standard angle pulse intervals are $T_{j-2}, T_{j-1}, T_j, T_{j+1}$ ..., the average engine stability LUm will be obtained from the following equations:

$$Lm = \frac{1}{n} \overset{n}{\underset{}{\Sigma}} | Lu_j | \qquad (1)$$

where n is number of engine revolution, $Lu_j$ is current engine stability of each cycle of engine revolution, which can be obtained from:

$$LU_j = \Delta(\Delta T_j)/T_j 3 \qquad (2)$$

$$\Delta(\Delta T_j) = T_j - 2T_{j-1} + T_{j-2} \qquad (3)$$

If the average engine stability LUm is less than the allowable maximum engine stability LUmM, the difference of the coolant temperature $\Delta T_W$ is compared with the target warm up rate $\Delta T_{WM}$ determined at step 122, at step 136. When the coolant temperature difference $\Delta T_W$ is equal to or more than the determined target warm up rate $\Delta T_{WM}$, the program execution jumps to "Marge 3" and otherwise spark advance TADV determined in the preceding cycle of the program execution is retarded at a given rate $\Delta$TADVR at a step 138. After processing of step 138, the program execution jumps to "Marge 4". On the other hand, when the decision that the average engine stability LUm is equal to or larger than the allowable maximum engine stability LUmM, is made at step 134, the coolant temperature difference (the engine warm up rate) $\Delta T_W$ and the target warm up rate $\Delta T_W$ are compared at step 140 similarly as in step 136. If the coolant temperature difference $\Delta T_W$ is less than the target warm up rate $\Delta T_{WM}$, the execution of the program goes to the block 138 to retard the spark advance TADV. When the coolant temperature $\Delta T_W$ is equal to or more than the target warm up rate $\Delta T_{WM}$, the spark advance TADV of the immediately previous cycle of control operation is advanced at a given rate $\Delta$TADVA, at step 142. After processing of step 142, the execution of the program jumps to "Marge 5".

When the decision that the actual engine speed $N_{RPM}$ is less than the allowable maximum engine speed $N_{MAX}$, is made at step 130, the average engine stability LUm and the allowable maximum engine stability LUmM are compared with each other similarly as in step 134, at step 144. If the average engine stability LUm is equal to or more than the allowable maximum engine stability LUmM, the coolant temperature difference $\Delta T_W$ is checked to see whether it is less than the target warm up rate $\Delta T_{WM}$, at step 146. When the decision is made that the coolant temperature difference $\Delta T_W$ is equal to or more than the target warm up rate $\Delta T_{WM}$, the program execution goes to the block 142 in order to advance the spark advance TADV. Otherwise, the duty factor $I_{DUTY}$ of the control signal to be fed to the actuator 94 is incremented at a given rate $\Delta I_H$ at step 148. The step 148 is followed by a routine starting from "Marge 6". If the decision is made at step 144 that the average engine stability LUm is less than the allowable maximum engine stability LUmM, the coolant temperature difference $\Delta T_W$ is compared with the target warm up rate $\Delta T_{WM}$ at step 150. When the coolant temperature difference $\Delta T_W$ is equal to or more than the target warm up rate $\Delta T_{WM}$, the execution of the program jumps to "Marge 7". On the other hand, if the collant temperature difference $\Delta T_W$ is less than the target warm up rate $\Delta T_{WM}$, the duty factor $I_{DUTY}$ of the control signal is incremented at the given rate $\Delta I_H$ at step 152 and the spark advance TADV is retarded at the given rate $\Delta TADVR$ at step 154. Thereafter, the controller operation starts from "Marge 4".

Figure 7:
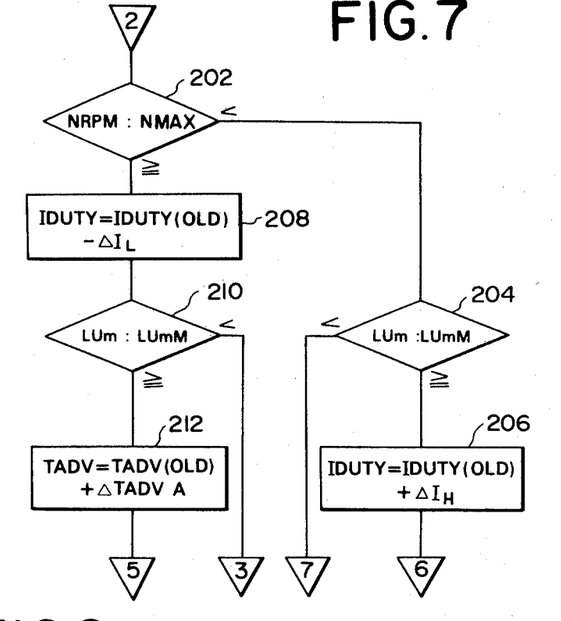
FIG. 7 is a flowchart of a second routine to be executed following to the main routine of FIG. 5 when the rate of varying of engine temperature is less than the first predetermined value and is equal to or more than the second predetermined value.

In a routine starting from "Marge 2" following step 124, the actual engine speed $N_{RPM}$ is checked to see whether it exceeds or is equal to the determined allowable maximum engine speed $N_{MAX}$ at step 202. If the actual engine speed $N_{RPM}$ is less than the allowable maximum engine speed $N_{MAX}$, the average engine stability LUm is compared with the determined allowable maximum engine stability LUmM at step 204. If the average engine stability LUm is equal to or more than the allowable maximum engine stability LUmM, the duty factor $I_{DUTY}$ of the control signal to be fed to the actuator 94 of the pressure regulating valve 68 is incremented at a given rate $\Delta I_H$, at step 206. Thereafter, the execution of the program goes to "Marge 6". On the other hand, when the average engine stability LUm is less than the allowable maximum engine stability LUmM, the program execution jumps to "Marge 7".

If the engine speed $N_{RPM}$ is equal to or more than the allowable maximum engine speed $N_{MAX}$, the duty factor $I_{DUTY}$ of the control signal is decremented at a given rate $\Delta I_L$ at step 208. Thereafter, the average engine stability LUm is checked whether the average engine stability LUm is less than the allowable maximum engine stability LUmM at step 210. When the average engine stability LUm is equal to or more that the allowable maximum engine stability LUmM, the spark advance TADV is advanced at a given rate $\Delta TADVA$ at step 212 and thereafter the program execution jumps to "Marge 5". If the average engine stability LUm is less than the allowable maximum engine stability LUmM, the program execution goes to "Marge 3".

Figure 8:
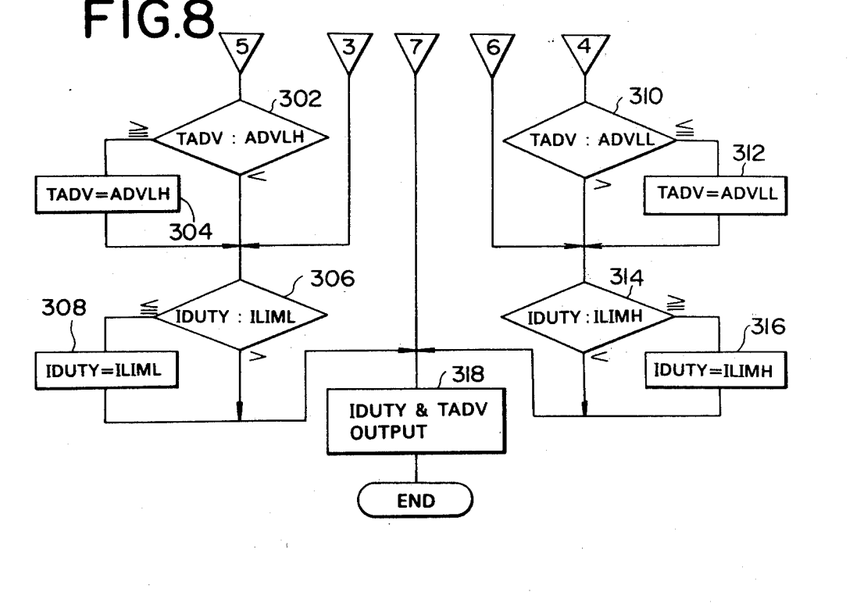
FIG. 8 is a flowchart of the third routine sequentially executed following to the first or second routine, the third routine is to determine the air flow rate and the spark timing.

Following step 142 or 212, the advanced spark advance TADV is compared with a predetermined upper limit of the spark advance ADVLH, at step 302. When the spark advance TADV is equal to or more than the spark advance upper limit ADVLH, the spark advance TADV is corrected to match with the predetermined upper limit ADVLH of the spark advance at step 304. After correcting the spark advance to the spark advance upper limit ADVLH, the duty factor $I_{DUTY}$ of the control signal is compared with a predetermined lower limit of the duty factor ILIML at step 306. When the duty factor $I_{DUTY}$ is equal to or less than the duty factor lower limit ILIML, the duty factor $I_{DUTY}$ is corrected to the duty factor upper limit ILIML at step 308. If the duty factor $I_{DUTY}$ is more than the duty factor lower limit ILIML, or after correcting the duty factor $I_{DUTY}$ to the duty factor lower limit ILIML at step 308, the spark advance TADV and the duty factor $I_{DUTY}$ of the control signal to control the actuator 94 is outputted at step 318.

On the other hand, following the block 150 or 204, the routine starts at "Marge 7". In this case, the execution of the routine directly goes to step 318 to output the spark advance TADV and the duty factor $I_{DUTY}$ of the control signal for the actuator 94. Further, if the program execution enters the routine beginning at the "Marge 4", the spark advance TADV is checked whether it is less than a predetermined spark advance lower limit ADVLL, at step 310. If the spark advance TADV is equal to or less than the spark advance lower limit ADVLL, the spark advance is corrected to the spark advance lower limit ADVLL at step 312. When the spark advance TADV is more than the spark advance lower limit ADVLL, after processing in the block 312 for correcting the spark advance TADV to the lower limit ADVLL or the execution of the program begins at the "Marge 6", the duty factor $I_{DUTY}$ of the control signal is compared with a predetermined duty factor upper limit ILIMH at step 314. When the duty factor $I_{DUTY}$ is equal to or more than the duty factor upper limit ILIMH, the duty factor $I_{DUTY}$ is corrected to the upper limit ILIMH at step 316. After connecting the duty factor $I_{DUTY}$ at step 316 or if the duty factor $I_{DUTY}$ is less than the upper limit ILIMH, the spark advance TADV and the duty factor $I_{DUTY}$ of the control signal are outputted at step 318.

Figure 9:
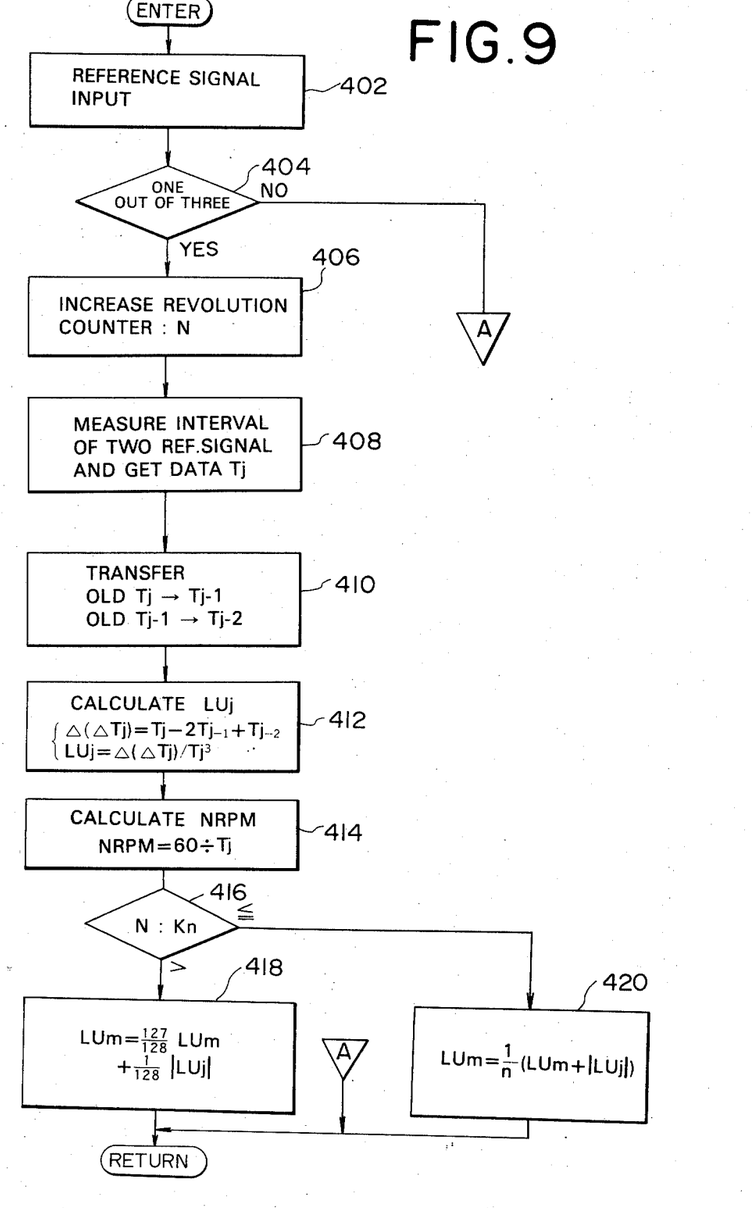
FIG. 9 is a flowchart of an interruption routine to be executed per every given period of time in order to determine engine speed.

Now, we refer to FIG. 9 there is illustrated a routine executed as the interruption routine per every given crank revolution angle. The crank angle for executing the interruption routine is to be determined depending on the number of the engine cylinders or by taking into account the other known factors. For example, in case of 6 cylinder, 4-cycle reciprocating internal combustion engine, so called 6 cylinder, 4-cycle Otto engine, the interruption routine will be executed per every 120° of crank revolution which is detected by the crank angle sensor 106 and is represented by the crank angle sensor signal. The interruption routine shown in FIG. 9 is to determine the engine speed $N_{RPM}$ and the average engine stability LUm for use in the main routine.

Immediately after the execution enters into the interruption routine, a reference crank angle signal which is generated per every 120° of the crank revolution is inputted at step 402. In the specific example given hereinbelow with respect to 6 cylinder, 4-cycle combustion engine, therefore, three reference crank angle signals are inputted as per one cycle of engine revolution. One of the three reference signal serves as a crank standard angle signal. The inputted reference crank angle signal is checked to see whether it is the crank standard angle signal, at step 404. If the decision at step 404 is "Yes", a counter value of a counter which counts up the inputted crank standard angle signal, is incremented by 1, at step 406. Thereafter, an intervals $T_j$ each adjacent crank standard angle signal is determined at step 408. The determined crank standard angle signal interval is stored in the memory unit of the controller, which memory unit for storing the determined interval may be shiftable of the data therein. By sequentially determining the intervals of respectively adjacent crank standard angle signals, signals indicative of intervals $T_{j-2}$, $T_{j-1}$, $T_j$—are inputted into the memory unit. In the memory unit, the signal value indicative of the intervals $T_{j-2}$ and $T_{j-1}$ obtained in two cycle preceding and immediate preceding cycles of routine execution and the interval $T_j$ determined in the current cycle are stored. The storage of the data in the memory unit are shifted in response to writing in of the new data per each cycle in order, at a block 410.

Based on the storage in the memory unit, a calculation is performed according to the foregoing equations (2) and (3) in order to obtain a temporary engine stability $LU_j$, at step 412. Following step 412 the actual engine speed $N_{RPM}$ is determined based on the crank angle signal fed from the crank angle sensor 106 at step 414. The actual engine speed $N_{RPM}$ may be obtained from:

$$N_{RPM} = 60/T_j$$

Thereafter, the execution of the routine jumps to step 416.

The counter value N incremented at step 406 is compared with a predetermined value $K_n$ at step 416. If the counter value N is equal to or less than the predetermined value $K_n$, the average engine stability LUm is calculated from:

$$LUm = 1/N\ (LUm + |Lu_j|)$$

at step 420. When the counter value N is more than the predetermined value $K_n$, the average engine stability LUm is calculated from:

$$LUm = 127/128 LUm + 1/128 |LU_j|$$

at step 418.

After processing of either one of steps 418 and 420, the interruption routine is ended to return the main routine. On the other hand, if the reference crank angle signal is not crank standard angle signal at the step 404, the execution of the interruption is ended to return main routine immediately after processing of the step 404.

It should be noted that the duty factor $I_{DUTY}$ of the control signal to be fed to the actuator 94 and defining the ratio of energized period and deenergized period of the actuator can be obtained in various known manners. For example, the pending United States Patent Applications Ser. Nos. 146,427, 152,094, 154,051, 151,537, 141,978 and 154,048 respectively filed on May 5, 1980, May 21, 1980, May 28, 1980, May 19, 1980, Apr. 24, 1980 and May 28, 1980, filed by Kenji IKEURA and assigned to the same assignee of the present application. Those co-pending applications shows "INTAKE AIR CONTROL SYSTEM FOR AN INTERNAL COMBUSTION ENGINE" in which is illustrated a method for feedback controlling the duty factor of the control signal based on the difference of the target engine speed and the actual engine speed, in use with a microcomputer. Likewise, United States Pat. No. 3,835,819 shows one of the ways for controlling spark advance in use with the microcomputer. However even though there is given specific methods for controlling the intake air flow rate in the engine idle position and spark advance recited in the specific prior applications, the instant application should not be understood to be limited to such manner of control in determination of the duty factor of the control signal and spark advance.

Now returning to the controller program illustrated in FIGS. 5 to 9, hereinbelow there is given even further slightly detailed explanation with respect to the controller operation with reference to FIGS. 2 to 4.

At the first stage of the program execution, the warm up rate $\Delta T_W$ of the engine coolant is obtained by subtracting the engine coolant temperature signal value inputted upon the immediately previous cycle of the device operation from the current one. The determined warm up rate $\Delta T_W$ compared with a required target warm up rate represented the predetermined value $K_1$. When the determined warm up rate $\Delta T_W$ is less than the minimum rate $K_1$, the engine coolant temperature $T_W$ is compared with another predetermined value $K_2$ which represents the lower limit of the engine coolant temperature normal range. Therefore, steps 118 and 120 are provided to discriminate whether the engine temperature requires a warm up operation. Namely, if the determined temperature difference $\Delta T_W$ is less than the required minimum warm up rate, and the engine temperature in higher than the predetermined lower limit of the normal engine temperature range, the engine is not required to be further warmed up and otherwise the decision is made that the engine is in a cold engine condition. Therefore, the routine beginning at the "Marge 1" is adapted for warm up control of the engine under cold engine conditions, and the routine beginning at the "Marge 2" merely controls the engine idling so as to minimize the exhaust emission and the fuel consumption under engine idling conditions.

In the cold engine condition in which engine warm up is required, at first, the engine speed is feedback controlled based on the difference between the target engine speed $N_{MAX}$ and the actual engine speed $N_{RPM}$. In the block 132 to be executed when the actual engine speed is higher than or equal to the target engine speed, the duty factor $I_{DUTY}$ is decremented at a given constant rate $\Delta I_L$, which given constant rate represents desired decreasing rate of the engine speed which is achieved by decreasing of the intake air flow rate supplied to the intake manifold. The engine stability is determined based on the engine speed. The determined engine stability is compared with the predetermined allowable maximum engine stability.

If the actual engine speed $N_{RPM}$ is equal to or more than the target engine speed $N_{MAX}$, and if the average engine stability LUm obtained from the foregoing equation (1) is less than the maximum engine stability LUmM, and if the engine warm up rate $\Delta T_W$ is equal to or higher than the maximum warm up rate $\Delta T_{WM}$, the spark advance is maintained to the same as the immediately preceding cycle of control operation. If the actual engine speed $N_{RPM}$ is equal to or more than the target engine speed $N_{MAX}$, average engine stability LUm is less than the maximum engine stability LUmM and if the warm up rate $\Delta T_W$ is lower than the target warm up rate $\Delta T_{WM}$, the spark advance is retarded at a given rate $\Delta TADVR$. If the engine speed $N_{RPM}$ is equal to or more than the target engine speed $N_{MAX}$, and if the average engine stability LUm is equal to or more than the allowable maximum engine stability LUmM and if the engine warm up rate $\Delta T_W$ is lower than the target warm up rate $\Delta T_{WM}$, the spark advance is retarded at a rate $\Delta TADVR$. If the engine speed $N_{RPM}$ is equal to or more than the target engine speed $N_{MAX}$, and if the average engine stability LUm is equal to or more than the allowable maximum engine stability LUmM and if the the engine warm up rate $\Delta T_W$ is equal to or more than the target warm up rate $\Delta T_{WM}$, the spark advance is advanced at a given rate $\Delta TADVA$.

On the other hand, if the engine speed $N_{RPM}$ is less than the target engine speed $N_{MAX}$, and if the average engine stability LUm is equal to or more than the allowable maximum engine stability LUmM and if the engine warm up rate $\Delta T_W$ is equal to or more than the target warm up rate $\Delta T_{WM}$, the spark advance is advanced at the rate $\Delta TADVA$. If the engine speed $N_{RPM}$ is less than the target engine speed $N_{MAX}$, and if the average engine stability LUm is equal to or more than the allowable maximum engine stability LUmM and if the engine warm up rate $\Delta T_W$ is less than the target engine warm up rate $\Delta T_{WM}$, the engine speed is accelerated at a given rate by incrementing the duty factor $I_{DUTY}$ of the control signal to be fed to the actuator 94 at a given rate $\Delta I_H$. If the engine speed $N_{RPM}$ is less than the target engine speed $N_{MAX}$, and if the average engine stability LUm is less than the allowable maximum engine stability LUmM and if the engine warm up rate $\Delta T_W$ is less than the target warm up rate $\Delta T_{WM}$, the engine speed is accelerated at the given rate and the spark advance is retarded. If the engine speed $N_{RPM}$ is less than the target engine speed $N_{MAX}$, and if the average engine stability LUm is less than the allowable maximum engine stability LUmM and if the engine warm up rate $\Delta T_W$ is equal to or more than the target warm up rate $\Delta T_{WM}$, the engine speed and the spark advance are maintained as same as to those of the immediately preceding cycle of the control operation.

In case the spark advance is retarded, retarding of the spark advance is limited at the given lower limit ADVLL. If the retarded spark advance becomes less than the lower limit, the spark advance is corrected to the lower limit and thereafter outputted to retard the spark ignition timing from that of the preceding cycle. Likewise, the upper limit of the spark advance is preset to limit advancing of the spark advance. On the other hand, there are given the minimum and maximum value of the duty factor of the control signal for controlling the ratio of energized period and deenergized period of the actuator 94 of the pressure regulating valve 68.

Thus, according to the present invention, the warm up characteristics of the engine under cold engine conditions has been improved with adapting the engine driving condition to the engine operation condition. Further, by controlling the engine speed and the spark advance corresponding to the engine condition, one can maximize the engine warm up efficientcy and minimize the fuel consumption and the exhaust emission.

What is claimed is:

1. A warm up control system for an internal combustion engine comprising:
    an engine temperature sensor for determining engine temperature and generating a temperature signal having a signal value proportional to the determined engine temperature;
    a crank angle sensor detecting crank revolution angle per each predetermined angle and generating a crank angle signal per the predetermined angle of crank shaft revolution;
    a controller receiving said temperature signal and said crank angle signal and determining a target engine speed, a target engine warm up rate based on the temperature signal indicative of the determined engine temperature, and determining a control signal for controlling idle air flow rate and thereby for controlling the engine speed and a spark advance of the engine so that the engine operating condition is controlled to the determined target engine speed with the determined target warm up rate; maximum engine stability;
    an idle air control means responsive to said control signal and varying of air flow rate flowing therethrough for controlling the engine speed to said target engine speed; and
    a spark ignition device responsive to a spark signal fed from said controller at the determined spark advance angle.

2. A control system as set forth in claim 1, wherein said controller determines the spark advance based on stability calculated from a and the determined maximum engine warm up rate.

3. A control system as set forth in claim 1 or 2, wherein said controller determines the target engine speed in relatively high when the engine temperature is not in a normal engine temperature range and determine the target engine speed at a minimum value upon the engine being idling in the normal temperature range.

4. A control system as set forth in claim 3, wherein said controller determines the duty factor of said control signal based on the difference of the actual engine speed and the target engine speed so that said controller reduces the difference of the engine speeds to zero.

5. A control system as set forth in claim 4, wherein said controller controls acceleration of the engine speed so that the engine warm up rate does not exceed the determined maximum engine warm up rate.

6. A control system as set forth in claim 1 or 2, wherein said controller controls the engine speed and the spark advance so that increase the warm up efficiency under substantially cold engine condition with required engine stability and engine warm up rate spark.

7. An electronic warm up control system for an automotive vehicle for controlling an idle air flowing through an auxiliary air intake passage bypassing a throttle chamber of a primary air intake passage, and a spark ignition timing and a spark advance corresponding to the engine operating condition, which control system including an idle air control valve means operable in response to a control signal fed from a controller, wherein said control system comprising:
    an engine temperature sensor for determining the engine temperature and generating an engine temperature signal indicative of the determined engine temperature;
    a crank angle sensor for detecting crank standard angle and crank refrence angle and generating a crank standard angle signal and reference crank angle signal;
    a controller receiving said engine temperature signal, crank standard angle signal and the reference crank angle signal and determining engine speed, said controller determining a target engine speed and a maximum engine warm up rate corresponding to the engine temperature signal by looking up tables respectively storing the target engine speed and the maximum engine warm up rate in relation to the engine temperature and feedback controlling the engine speed based on the difference between the determined actual engine speed and the target engine speed and controlling the spark advance and spark ignition timing in relation to the maximum engine warm up rate so that the engine warm up efficiency is increased with a suitable engine operating condition corresponding to the engine condition.

8. A control system as set forth in claim 7 or 8, wherein said idle air control valve includes a valve member responsive to a control vacuum generated by a pressure regulating valve which is operated by an electromagnetically operable actuator and said controller generates a control signal representative of duty factor of the actuator indicating ratio of energized period and deenergized period thereof.

9. A control system as set forth in claim 8, wherein said controller feedback controls the duty factor of the control signal corresponding to the difference of the actual engine speed and the target engine speed so that it reduce the difference to zero.

10. In a warm up control system for an internal combustion engine for effective start up characteristics of the engine, a method for controlling the engine operation comprising:

determining an engine temperature and generating a first signal indicative of the determined engine temperature;

detecting a crank revolution angle and generating a second signal per each predetermined crank revolution angle;

determining a target engine speed based on the engine temperature represented by said first signal;

determining a required maximum engine warm up rate based on the engine temperature represented by said first signal;

feedback controlling the engine speed by controlling an idle air flow rate corresponding to a difference between the target engine speed and the actual engine speed represented by the second signal in order to reduce the difference to zero; and controlling a spark ignition timing and a spark advance so that the engine warm up rate is kept at the determined maximum warm up rate 11. A method as set forth in claim 10, wherein said method further including a step for distinguishing the engine temperature condition whether the engine requires warm up operation in relation to a normal engine temperature range.

12. A method as set forth in claim 11, wherein said target engine speed, said maximum engine warm up rate and is tables according to a predetermined characteristics, said target engine speed and the maximum engine warm up rate are pre-set corresponding to the engine temperature and said temperature.

* * * * *